(12) United States Patent
Sodani et al.

(10) Patent No.: US 7,600,103 B2
(45) Date of Patent: Oct. 6, 2009

(54) SPECULATIVELY SCHEDULING MICRO-OPERATIONS AFTER ALLOCATION

(75) Inventors: Avinash Sodani, Portland, OR (US); Rahul Kulkarni, Portland, OR (US); David K. Li, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 14 days.

(21) Appl. No.: 11/479,746

(22) Filed: Jun. 30, 2006

(65) Prior Publication Data

US 2008/0005535 A1 Jan. 3, 2008

(51) Int. Cl.
*G06F 9/34* (2006.01)
(52) U.S. Cl. ....................................... 712/246
(58) Field of Classification Search ................. 712/246
See application file for complete search history.

(56) References Cited

U.S. PATENT DOCUMENTS 5,463,745 A * 10/1995 Vidwans et al. ............. 712/218
5,555,432 A * 9/1996 Hinton et al. ................. 712/23
5,887,161 A * 3/1999 Cheong et al. ............... 712/244
2003/0208672 A1* 11/2003 Leenstra et al. ............. 712/200
2004/0133769 A1* 7/2004 Chaudhry et al. ........... 712/233

OTHER PUBLICATIONS

Srinivasan et al. "A Minimal Dual-Core Speculative Multi-Threading Architecture". Porcessing of the IEEE International Conference on Computer Design. Oct. 2004.*
Pending U.S. Appl. No. 11/363,195; filed Feb. 27, 2006; inventor: Savransky.
State Intellectual Property Office, P.R. China, Second Office Action dated Feb. 20, 2009 in related patent application.
Patent Office of the People's Republic of China, First Office Action dated Aug. 8, 2008, 13 Pages Total.

* cited by examiner

*Primary Examiner*—Eddie P Chan
*Assistant Examiner*—Robert E Fennema
(74) *Attorney, Agent, or Firm*—Trop, Pruner & Hu, P.C.

(57) ABSTRACT

Apparatus, systems and methods for speculative scheduling of uops after allocation are disclosed including an apparatus having logic to schedule a micro-operation (uop) for execution before source data of the uop is ready. The apparatus further includes logic to cancel dispatching of the uop for execution if the source data is invalid. Other implementations are disclosed.

18 Claims, 6 Drawing Sheets

US 7,600,103 B2

SPECULATIVELY SCHEDULING MICRO-OPERATIONS AFTER ALLOCATION

BACKGROUND

Pipelined microprocessor architectures often employ schemes to permit a newly allocated micro-operation ("uop") to bypass the microprocessor's execution scheduling logic or "reservation station" when that logic does not have another uop ready for scheduling. Such bypass schemes wait to schedule the uop until it can be determined whether the uop's source data is valid. If the source data is valid then the bypassing scheme schedules the uop and dispatches it for execution. If the source data is invalid then the bypassing scheme will abort scheduling of the uop and return the uop to the scheduling logic. However, waiting for confirmation of the source data inserts latency or "bubbles" in the pipeline wasting valuable processor cycles between allocation of the uop and its scheduling.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following description refers to the accompanying drawings. Among the various drawings the same reference numbers may be used to identify the same or similar elements. While the following description provides a thorough understanding of the various aspects of the claimed invention by setting forth specific details such as particular structures, architectures, interfaces, techniques, etc., such details are provided for purposes of explanation and should not be viewed as limiting. Moreover, those of skill in the art will, in light of the present disclosure, appreciate that various aspects of the invention claimed may be practiced in other examples or implementations that depart from these specific details. At certain junctures in the following disclosure descriptions of well known devices, circuits, and methods have been omitted to avoid clouding the description of the present invention with unnecessary detail.

Figure 1:
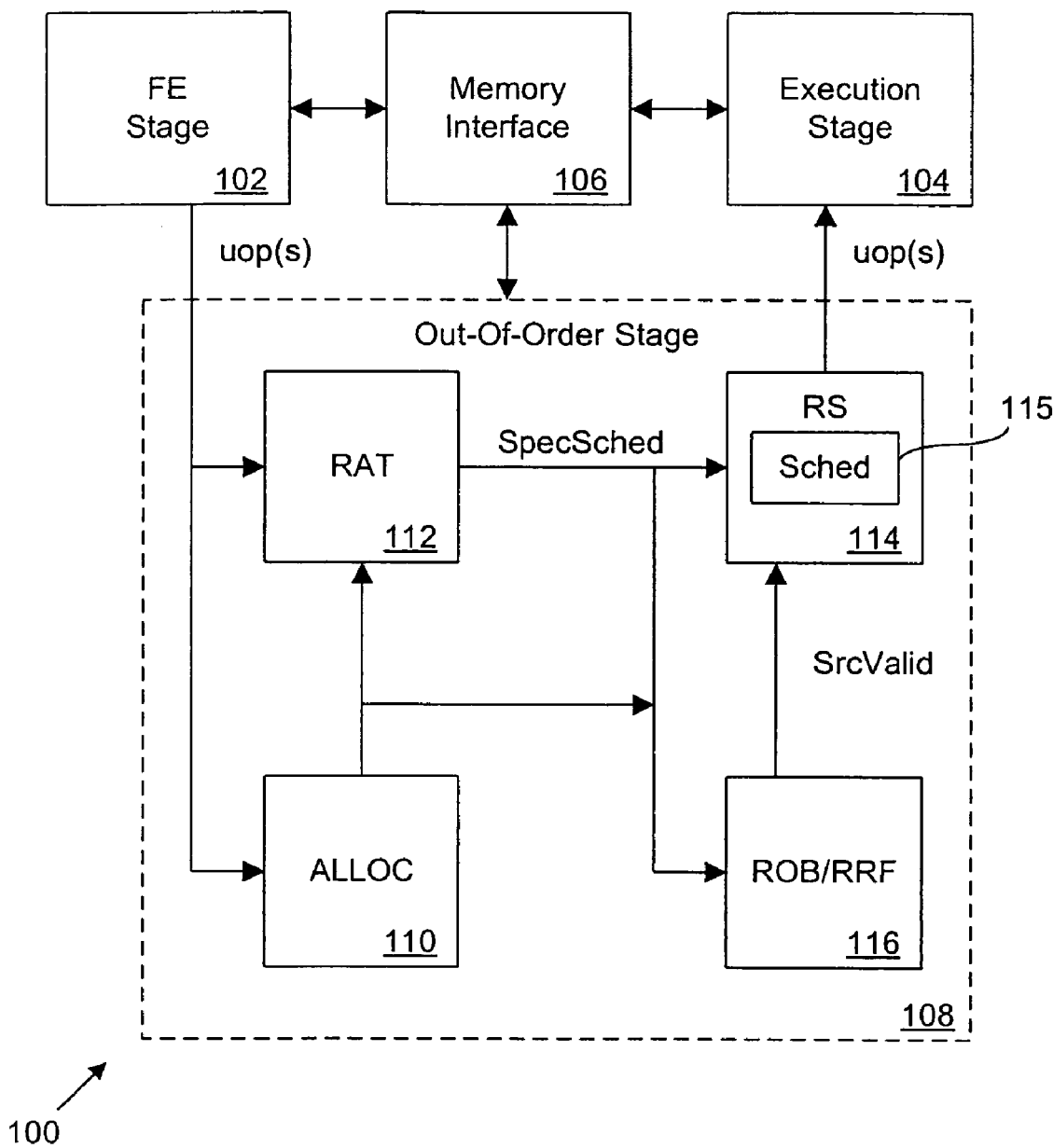
FIG. 1 is a block diagram illustrating portions of a processor in accordance with some implementations of the invention.

FIG. 1 is a schematic diagram of portions of a processor 100 in accordance with some implementations of the invention. Processor 100 includes a front end (FE) stage 102, an execution stage 104, memory interface 106, and an out-of-order (OOO) stage 108. OOO 108 includes allocation logic (ALLOC) 110, a register alias table logic (RAT) 112, reservation station logic (RS) 114 including one or more schedulers 115, and reorder buffer (ROB)/real register file (RRF) logic 116. FE 102, execution stage 104, and memory interface 106, included in FIG. 1 in the interests of completeness, provide functionality well known to those skilled in the art and thus will not be discussed in any further detail. Moreover, those skilled in the art will recognize that some processor components, such as instruction/data caches, branch target buffer, instruction fetch logic, etc. have been excluded from FIG. 1 so as to not needlessly obscure implementations of the invention.

Processor 100 may be one implementation of a Pentium® compatible processor such as those produced by Intel® Corporation. However, the invention may be practiced using other kinds of processors, such as an Itanium® Processor Family compatible processor or an X-Scale® family compatible processor. Further, processor 100 may comprise one processor core of multi-core microprocessor. The invention is, however, not limited to a particular processor or microprocessor architecture and may be implemented in any pipelined processor or microprocessor architecture.

FE 102 may provide decoded uops to OOO 108. ALLOC 110 may operate in conjunction with RAT 112 and ROB/RRF 116 to allocate physical registry entries for the uops provided to OOO 108. While RAT 112 may rename or map logical registers (e.g., x86 logical registers such as EAX, EBX, ECX, etc.) associated with a uop to physical registers (not shown) in ROB/RRF 116, ALLOC 110 may undertake the actual allocation of those physical registers. ALLOC 110 may also allocate the uop to an entry in RS 114 so that scheduler 115 may schedule the uop for execution by an execution unit (not shown) in execution stage 104. RS 114 may then dispatch the uop to stage 104 for execution. Execution of the uop may result in data being sourced from or stored to the physical registers in ROB/RRF 116 that RAT 112 maps to.

In accordance with some implementations of the invention, a uop supplied to OOO 108 by FE 102 may, if RS 114 does not already have a previously allocated uop ready for scheduling, be speculatively scheduled after being allocated for execution by ALLOC 110 without waiting for an indication from ROB/RRF 116 that the source data or sources for the uop are ready or are valid. RS 114 may speculatively schedule the uop in response to an indicator (e.g., SpecSched) provided by ALLOC 110 and associated with the uop.

In accordance with some implementations of the invention, RS 114 may cancel the speculative scheduling of the uop in response to one or more indicators provided by ROB/RRF 116 and associated with operand(s) or source(s) that the uop requires to execute. For example, ROB/RRF 116 may provide an indicator or signal (e.g., a negated SrceValid signal) to RS 114 to indicate that the speculatively scheduled uop should not be dispatched for execution because one or more data sources are not ready or are not valid. Furthermore, if the uop is canceled then, in accordance with some implementations of the invention, any dependent uops spawned by the speculatively scheduled uop may also be canceled.

Figure 2:
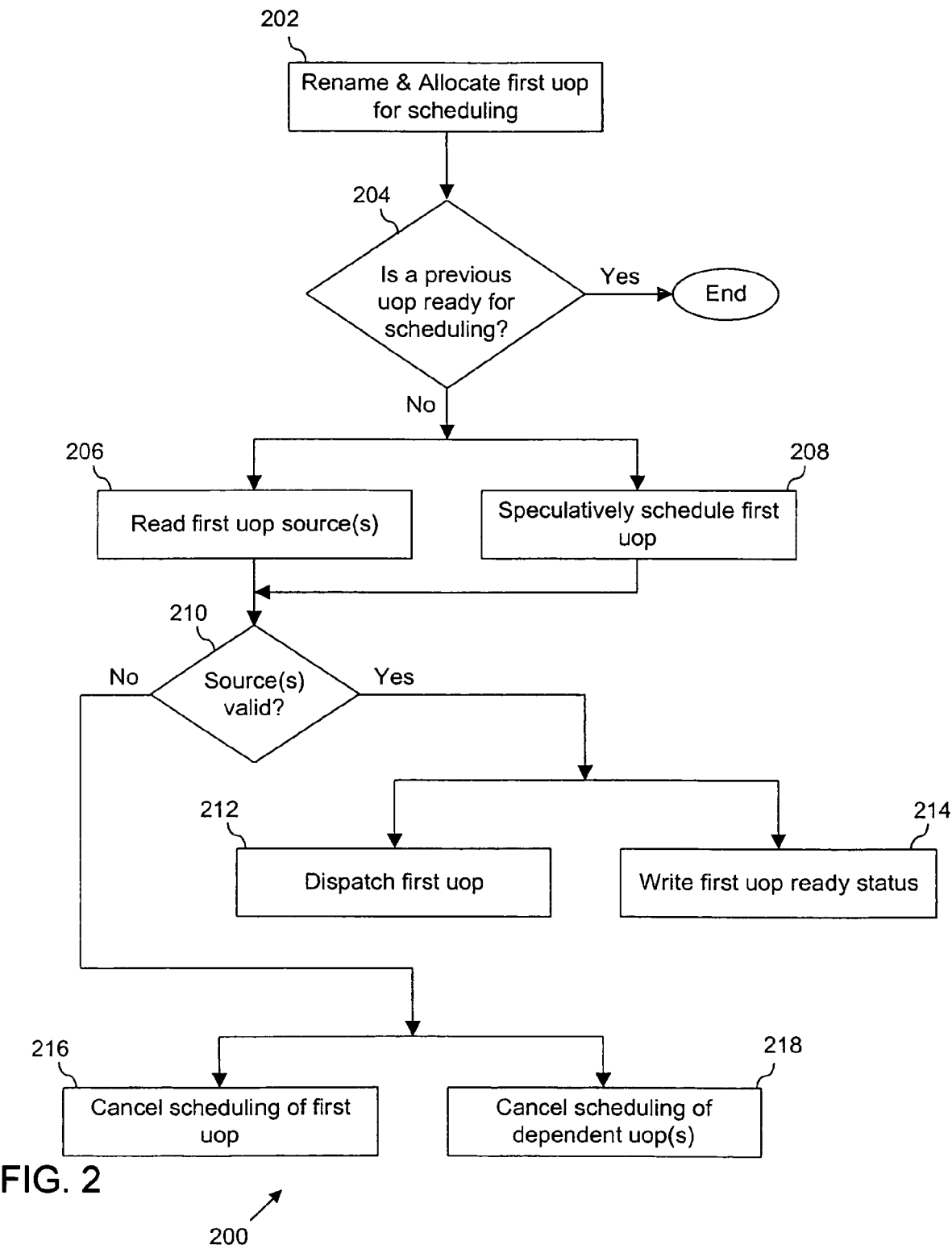
FIG. 2 is a flow chart illustrating a process in accordance with some implementations of the invention.

FIG. 2 illustrates a process 200 for speculatively scheduling uops after allocation in accordance with some implementations of the invention. While, for ease of explanation, process 200, and associated processes, may be described with regard to processor 100 of FIG. 1, the invention is not limited in this regard and other processes or schemes supported and/or performed by appropriate devices and/or combinations of devices in accordance with the invention are possible.

Figure 3:
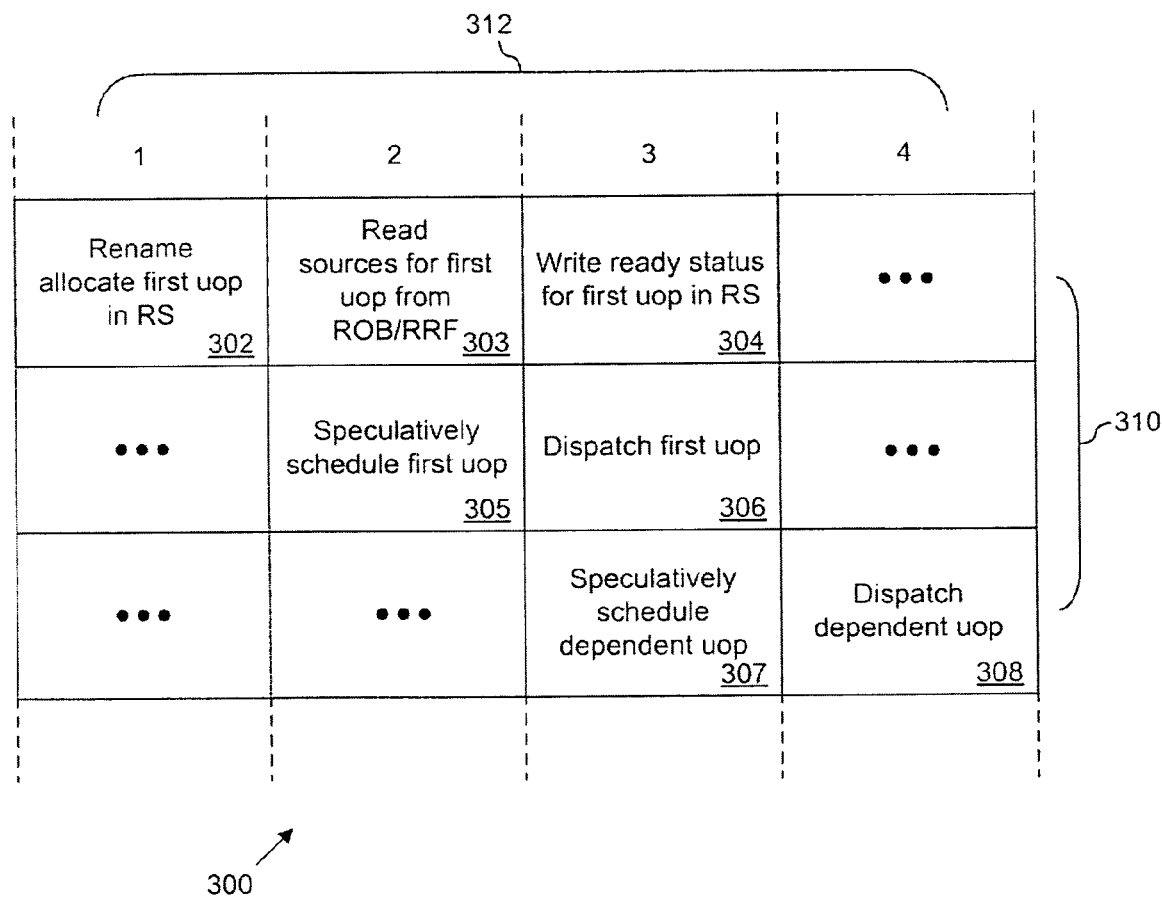
FIG. 3 illustrates a representative pipelined scheme in accordance with some implementations of the invention.

FIG. 3 illustrates a representative pipelined scheme 300 that may be associated with speculatively scheduling uops after allocation in accordance with some implementations of the invention. Scheme 300, illustrating representative operations 302-308 distributed across three processor pipelines 310 and over four pipeline stages 312, is provided to aid discussion of process 200 and is not intended to limit the invention to a particular pipelined scheme. For example, as those skilled in the art will recognize, while scheme 300 shows four pipeline stages 312, those skilled in the art will recognize that the four pipeline stages 312 may, in pipelined architectures employing scheduling logic capable of dispatching uops on both rising and falling clock edges, actually represent four processor half-cycles.

Returning to FIG. 2, process 200 may begin with the register renaming and allocation of a uop for scheduling [act 202]. In some implementations of the invention act 202 may be undertaken by ALLOC 110 allocating a uop, received from FE 102, into RS 114 from RAT 112. At the same time, RAT 112 may provide for renaming or mapping of the logical registers associated with the uop to the set of physical registers (not shown) associated with ROB/RRF 116. RAT 112 may also map the physical registers for the uop's sources or operands. In undertaking act 202, RAT 112 may also provide one or more signals or indicators (e.g., SpecSched) to RS 114 indicating to RS 114 that the uop is to be speculatively scheduled. Thus, referring to scheme 300 of FIG. 3, act 202 may result in operation 302 occurring in stage 1.

Process 200 may continue with a determination of whether a previous uop is ready for scheduling [act 204]. In some implementations of the invention, subsequent to receiving an indication from RAT 112 that the uop is to be speculatively scheduled, RS 114 may undertake the determination of act 204. Thus, if RS 114 contains a previously allocated uop that is ready for scheduling, then RS 114 may ignore the indication received from RAT 112 in act 202 and may not undertake speculative scheduling of the uop. In such case, act 204 may result in a positive determination (i.e., that a previous uop is ready for scheduling) and process 200 may terminate and the uop may not be speculatively scheduled.

If, on the other hand, it is determined, in act 204, that RS 114 does not have another, previously allocated, uop ready for scheduling then process 200 may continue with the acts of reading the source(s) or operand(s) for the uop [act 206] and the speculative scheduling of the uop [act 208]. In some implementations of the invention, act 206 may be undertaken by having RS 114 read the source(s) or source data associated with the uop from the physical registers of ROB/RRF 116 that were allocated to the uop's sources in act 202. In some implementations of the invention RAT 112 may identify the physical registers allocated to the uop's sources in act 202. The invention is, however, not limited to the order of acts 204 and 206 as shown in FIG. 2. For example, in some implementations of the invention act 204 (determining whether previous uop ready for scheduling) and act 206 (reading uop's sources) may be conducted in parallel. While undertaking act 206, RS 114 may also undertake act 208 by scheduling the uop. Thus, referring to scheme 300 of FIG. 3, acts 206 and 208 may result in respective operations 303 and 305 occurring in stage 2.

Process 200 may then continue with a determination of whether the source(s) for the uop are valid [act 210]. In some implementations of the invention, RS 114 may undertake the determination of act 210 in response to one or more signals or indicators (e.g., SrcValid) provided by ROB/RRF 116. If, for example, ROB/RRF 116 indicates that data operand or source is ready or valid (e.g., by providing a SrcValid signal) then act 210 may result in a positive determination. If, on the other hand, ROB/RRF 116 indicates that data operand or source is not ready or not valid (e.g., by providing a negated SrcValid signal) then act 210 may result in a negative determination.

Those skilled in the art will recognize that a uop may be associated with multiple data operands or sources and that, in that case, ROB/RRF 116 may provide a separate indicator or signal for each source, indicating to RS 114 whether or not each source is ready or valid. In such implementations, the determination of act 210 may be undertaken in response to any one of those indicators or signals.

If the outcome of act 210 is positive, that is, if the source(s) associated with the uop are ready or valid, the process 200 may continue with a dispatching of the uop [act 212] and the writing of a ready status for the uop [act 214]. In accordance with some implementations of the invention, act 212 may be undertaken by RS 114 providing or dispatching the uop to execution stage 104 and act 214 may be undertaken by RS 114 writing or indicating a ready status to a register (not shown) in RS 114. Thus, referring to scheme 300 of FIG. 3, acts 212 and 214 may result in respective operations 306 and 304 occurring in stage 3.

If, on the other hand, the outcome of act 210 is negative, that is, if the source(s) associated with the uop are not ready or are not valid, the process 200 may continue with the cancellation of the uop [act 216] and the cancellation of any dependent uop(s) [act 218]. In some implementations of the invention, act 216 may be undertaken by RS 114 cancelling, in response to one or more indicators or signals provided by ROB/RRF 116 in act 210, the speculative scheduling of the uop.

Figure 4A:
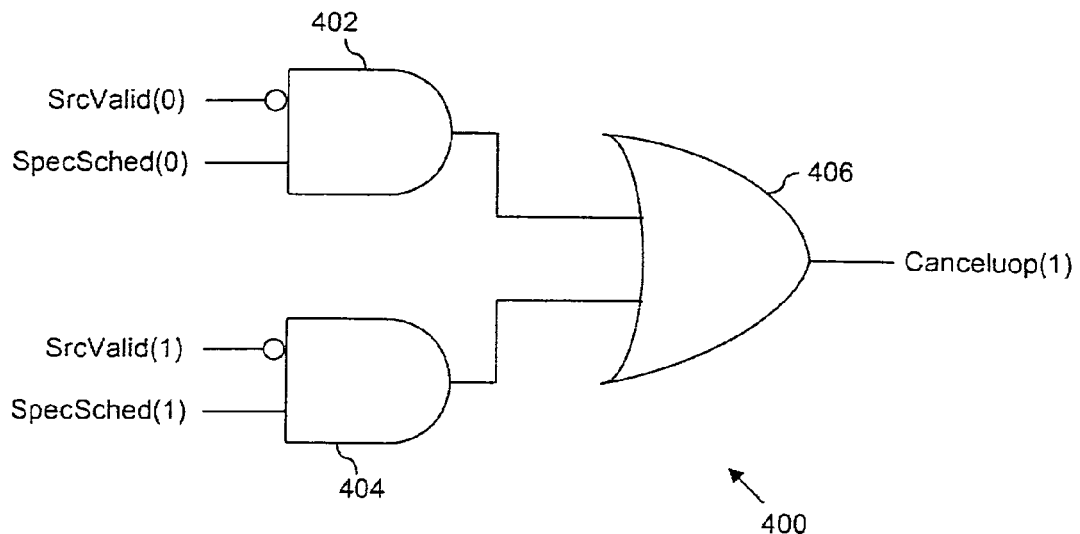
FIGS. 4A and 4B are schematic diagrams of logic in accordance with some implementations of the invention.

As those skilled in the art will recognize, if, referring also to FIG. 3, the uop had been speculatively scheduled in stage 2 (operation 305) then it is possible that the uop may have spawned one or more dependent uops that scheduled in stage 3 (operation 307) or later. Thus, if the source(s) associated with the uop are determined to be not ready or not valid in 210, such that the speculative scheduling of the uop is cancelled in act 216 and, hence, the uop is not dispatched in stage 3 (operation 306), then it may be necessary to cancel any scheduled dependent uops spawned by the uop FIG. 4A is a schematic diagram of logic or circuitry 400 that may be used in accordance with some implementations of the invention to undertake the cancellation of the scheduling of a uop in accordance with act 216 of process 200. Logic 400 includes first AND logic 402 that ands a signal (e.g., SpecSched(0)) indicating that the uop is to be speculatively scheduled with a signal (e.g., a negated SrcValid(0)) indicating that a first source or operand associated with the uop is not ready or is not valid. Logic 400 also includes second AND logic 404 that ands the signal (e.g., SpecSched(1)) indicating that the uop is to be speculatively scheduled with a signal (e.g., a negated SrcValid(1)) indicating that a second source or operand associated with the uop is not ready or is not valid. Logic 400 further includes OR logic 406 that ors together the output of AND logic 402 with the output of AND logic 404 to generate a control signal (e.g., Canceluop(1)) that indicates that the speculative scheduling of the uop is to be cancelled. In some implementations of the invention, logic 400 may be implemented in RS 114 and/or RAT 112 although the invention is not limited in this regard.

Cancelling dependent uops may require two pieces of information: (i) detecting that a uop is dependent on another uop (parent uop) that was speculatively scheduled, and (ii) detecting that the parent uop was cancelled. Consumedspeculativevalid (CSV) and Consumedrealvalid (CRV) signals may provide the above pieces of information, respectively. CSV for a source operand of a uop may be generated if the parent uop producing that source was scheduled speculatively (based on SpecSched). CRV for a source operand of a uop may be generated if the parent uop's speculation was correct (based on SrcValid signals). The parentage information about a uop may be obtained, for example, from RAT 112, which for a given implementation may generate this information for the purpose of standard register renaming, or can be computed by comparing the source operand registers of the uop with the output registers of other earlier uops. It may be appreciated by those of skill in the art that this may be accomplished by looking at the output registers of the uops that are speculatively scheduled but for which confirmation or cancellation of their speculation has not happened yet (i.e., between actions 208 and 212/216).

Figure 4B:
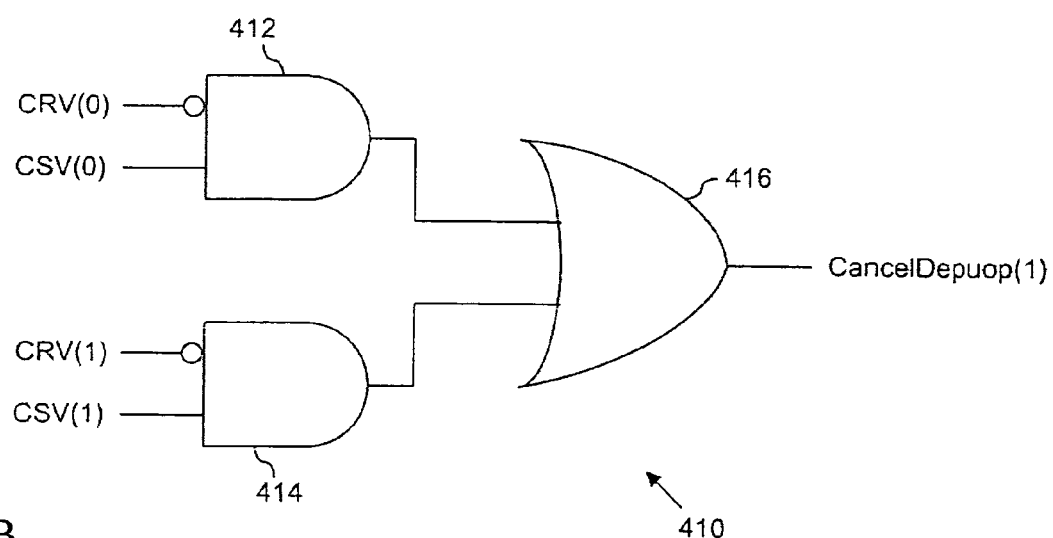

FIG. 4B is a schematic diagram of logic or circuitry 410 that may be used in accordance with some implementations of the invention to undertake the cancellation of the scheduling of a dependent uop in accordance with act 218 of process 200. Logic 410 includes first AND logic 412 that ands a signal (e.g., a negated ConsumedRealValid or CRV(0)) indicating that a first source or operand associated with the dependent uop is not ready or is not valid with a signal (e.g., ConsumedSpeculativeValid or CSV(0)) indicating that the dependent uop has been speculatively scheduled. Logic 410 also includes second AND logic 414 that ands the signal (e.g., CRV(1)) indicating that a second source or operand associated with the dependent uop is not ready or is not valid with a signal (e.g., a negated SrcValid(1)) indicating that the dependent uop has been speculatively scheduled. Logic 410 further includes OR logic 416 that ors together the output of AND logic 412 with the output of AND logic 414 to generate a control signal (e.g., CancelDepuop(1)) that indicates that the speculative scheduling of the dependent uop is to be cancelled. In some implementations of the invention, logic 410 may be implemented in RS 114 and/or RAT 112 although the invention is not limited in this regard.

The acts shown in FIG. 2 need not be implemented in the order shown; nor do all of the acts necessarily need to be performed. Also, those acts that are not dependent on other acts may be performed before or in parallel with the other acts. For example, act 206 may be undertaken in parallel with act 208. Similarly, acts 204 and 206 may be undertaken in parallel. Further, at least some of the acts in FIG. 2 may be implemented as instructions, or groups of instructions, implemented in a machine-readable medium.

Figure 5:
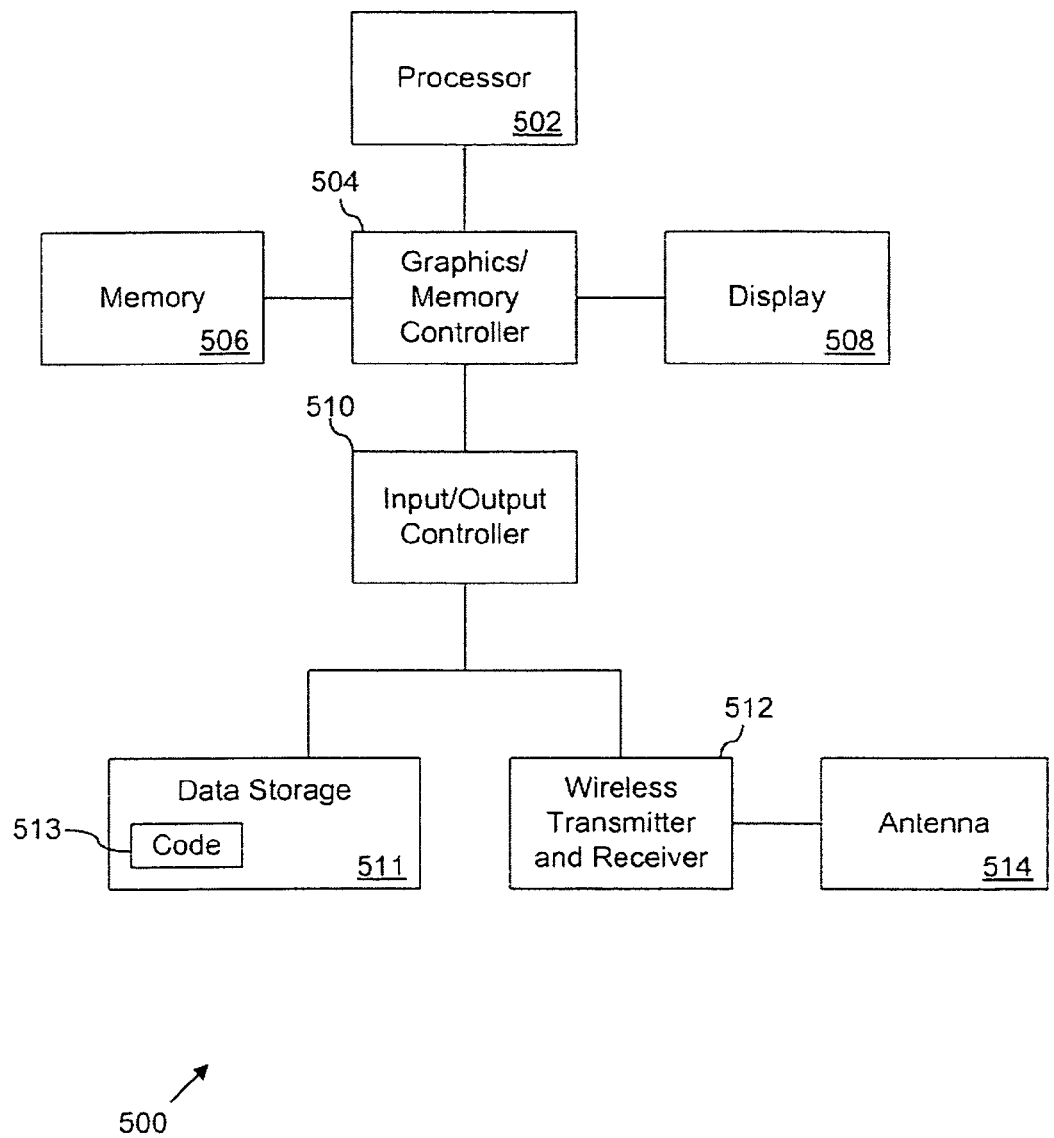
FIG. 5 is a block diagram illustrating a system in accordance with some implementations of the invention.

FIG. 5 illustrates a front-side-bus (FSB) computer system 500 that may be used to implement the invention. System 500 includes a processor 502, a graphics/memory controller 504, memory 506 (e.g., dynamic random access memory (DRAM), etc.), a display 508 (e.g., a flat panel display), an Input/Output controller 510, data storage 511 (e.g., one or more disk drives), wireless transmitter and receiver circuitry 512, and an antenna 514 (e.g., dipole antenna, narrowband Meander Line Antenna (MLA), wideband MLA, inverted "F" antenna, planar inverted "F" antenna, Goubau antenna, Patch antenna, etc.). In accordance with some implementations of the invention, processor 502 may provide the functionality of processor 100 as described in detail above. Storage 511 may store code 513 where that code may include instructions that, when decoded, provide one or more uops including the uop described above with respect to processor 100 and/or process 200. Memory 506 may, in turn, store one or more instructions where each of those instructions include one or more uops.

Figure 6:
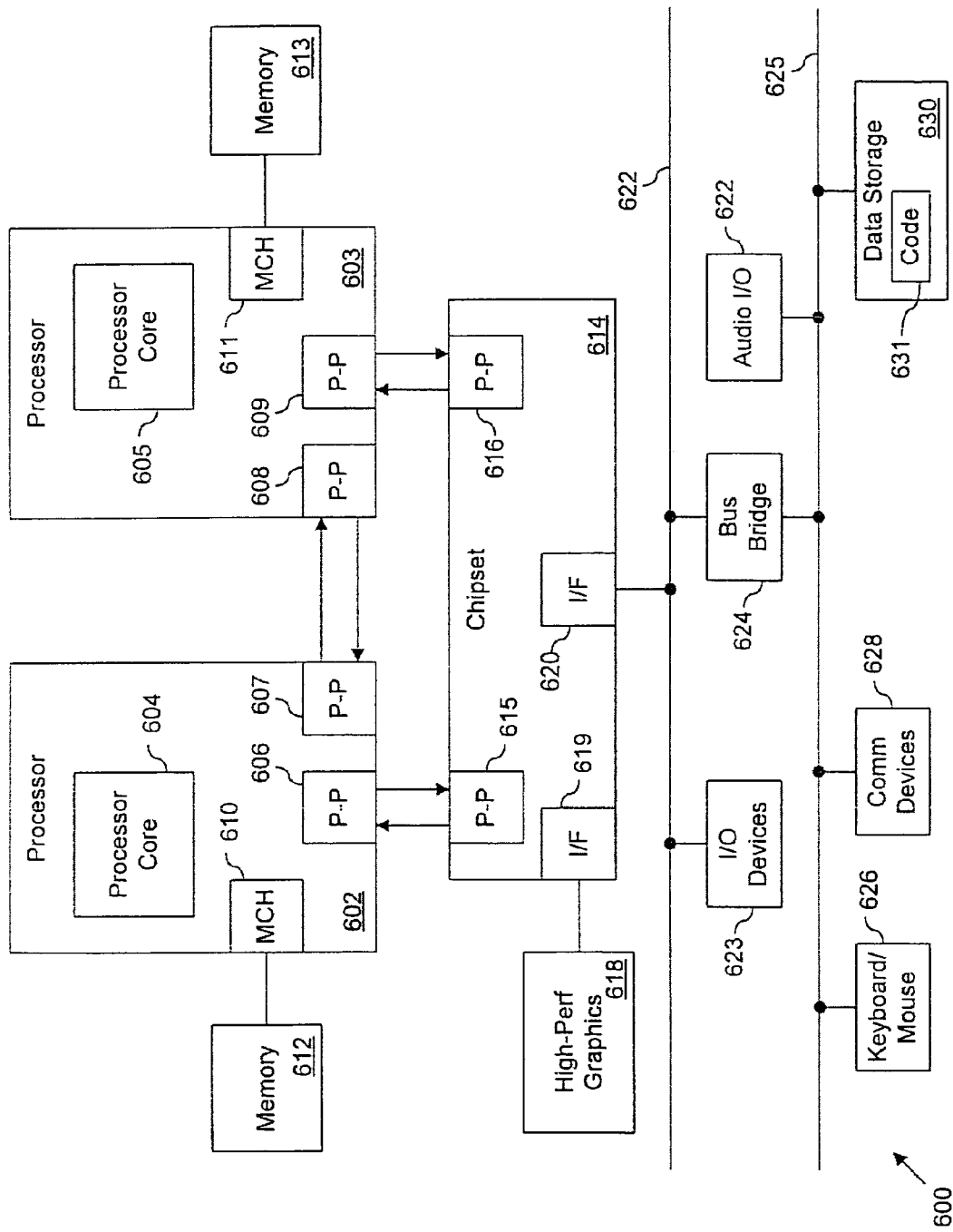
FIG. 6 is a block diagram illustrating another system in accordance with some implementations of the invention.

FIG. 6 illustrates a point-to-point (PtP) computer system 600 that may be used to implement the invention. System 600 includes at least two processors 602 and 603, each one including respective processor cores 604 and 605 and respective point-to-point (PtP) interfaces 606/607 and 608/609. Processors 602 and 603 also include respective memory control hubs (MCH) 610 and 611 coupling processors 602 and 603 to respective memories 612 and 613 (e.g., DRAM). Processors 602 and 603 may exchange data via interfaces 607 and 608. Processors 602 and 603 may also exchange data with a chipset 614 via respective interfaces 606 and 609 coupled to respective PtP interfaces 615 and 616 in chipset 614. Chipset 614 may also exchange data with high-performance graphics logic 618 via a graphics interface 619. In accordance with implementations of the invention, cores 604 and/or 605 may implement the functionality of processor 100 as described above.

Chipset 614 may also exchange data with a bus 622 via a bus interface 620 where, in various implementations, bus 622 may be a industry standard architecture (ISA) bus or a peripheral component interconnect (PCI) bus. Various I/O devices 623 and a bus bridge 624 may be coupled to bus 622 where bus bridge 624 may permit data to be exchanged between bus 622 and another bus 625. Bus 625 may be, in various implementations, a small computer system interface (SCSI) bus, an integrated drive electronics (IDE) bus, or a universal serial bus (USB) bus. Additional I/O devices, such as keyboard/mouse or other cursor control devices 626, audio I/O 622, communications devices 628 (e.g., modems, network interfaces, etc.), and data storage devices 630 (e.g., magnetic disk drive, optical disk drive, magneto-optical disk drive, magnetic tape, or non-volatile memory including flash memory). Storage 630 may store code 631 where that code may include instructions that, when decoded, provide one or more uops including the uop described above with respect to processor 100 and/or process 200.

Systems 500 and/or 600 may assume a variety of physical implementations. For example, system 500 or 600 may be implemented in personal computer (PC), a networked PC, a media PC, a server computing system, a set top box (STB), a handheld computing platform (e.g., a personal digital assistant (PDA)), a gaming system (portable or otherwise), a 3D capable cellular telephone handset, etc. Moreover, while some components of systems 500 or 600 may be implemented within a single device, such as a system-on-a-chip (SOC) integrated circuit (IC), components of systems 500 or 600 may also be distributed across multiple ICs or devices. For example, processor 502, controllers 504/510, memory 506, circuitry 512 and antenna 514 may be implemented, in part, as multiple ICs contained within a single computing platform, such as a media PC or a STB to name a few examples. While display 508 may also be implemented along with the other components of system 500 within a PC, STB or similar platform, it may, alternatively, also be implemented as a distinct device coupled to a platform containing the other components of system 500.

Those skilled in the art will recognize that uops and instructions may be used interchangeably or, alternatively, that uops may be considered to be sub-instructions of a decoded instruction. Thus, for example, some implementations of the invention may be performed using instructions while other implementations of the invention may be performed using uops.

In accordance with some implementations of the invention as described above, implementations of the invention include a speculative scheduling scheme that may eliminate the latency of bypassing a reservation station or scheduler. The speculative scheduling scheme may schedule a uop while its sources are being read from the ROB and then may selectively cancel the scheduling if the data in the ROB turns out to be invalid. In the event that the data is valid the speculative scheduling scheme can eliminate the latency associated with determining whether the source data is valid or not. In the event the data is invalid he speculative scheduling scheme may enforce the selective cancellation before the effects of the speculative scheduling has propagated too far.

The foregoing description of one or more implementations consistent with the principles of the invention provides illustration and description, but is not intended to be exhaustive or to limit the scope of the invention to the precise form disclosed. Modifications and variations are possible in light of the above teachings or may be acquired from practice of various implementations of the invention. Clearly, many other implementations may be employed to provide a method, apparatus and/or system to implement speculative scheduling of uops after allocation consistent with the claimed invention.

No element, act, or instruction used in the description of the present application should be construed as critical or essential to the invention unless explicitly described as such. Also, as used herein, the article "a" is intended to include one or more items. In addition, some terms used to describe some implementations of the invention, such as "operand" may be used interchangeably with "source data" in some circumstances. Moreover, when terms such as "coupled" or "responsive" are used herein or in the claims that follow, these terms are meant to be interpreted broadly. For example, the phrase "coupled to" may refer to being communicatively, electrically and/or operatively coupled as appropriate for the context in which the phrase is used. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. An apparatus, comprising:
   logic to speculatively schedule a micro-operation (uop) for execution before any determination of whether source data of the uop is ready if the logic does not have a previously allocated uop ready for scheduling and responsive to a speculative scheduling indication for the uop received from an allocator, and without regard to availability of the source data, and to read the source data in parallel with the speculative scheduling;
   logic to determine whether the source data is available and if so, to dispatch the uop to an execution stage and to write a ready status to the speculative scheduling logic in parallel with the dispatch; and
   logic to cancel dispatching of the uop for execution if the source data is invalid.

2. The apparatus of claim 1, further comprising:
   logic to cancel dispatching of a dependent uop for execution if the source data is invalid.

3. The apparatus of claim 2, wherein the logic to cancel dispatching of a dependent uop for execution if the source data is invalid includes AND logic responsive to first and second indicators, the first indicator to indicate that the uop has been speculatively scheduled and corresponding to the speculative scheduling indication, the second indicator to indicate that source data associated with the uop is not valid.

4. The apparatus of claim 3, further comprising:
   a register alias table to provide the first indicator; and
   a reorder buffer to provide the second indicator.

5. The apparatus of claim 3, wherein the logic to cancel dispatching of a dependent uop for execution if the source data is invalid includes additional AND logic responsive to the first indicator and to a third indicator, the third indicator to indicate that additional source data associated with the uop is not valid.

6. The apparatus of claim 1, further comprising:
   the allocator to generate the speculative scheduling indication; and
   a reservation station to receive the speculative scheduling indication from the allocator and to determine whether the previously allocated uop is ready for scheduling.

7. The apparatus of claim 6, further comprising a reorder buffer/register file coupled to the ready status, wherein the reservation station is to speculatively schedule the uop without waiting for an indication from the reorder buffer/register file as to the source data.

8. A system, comprising:
   memory to store an instruction, the instruction including a micro-operation (uop); and
   a processor including logic to schedule a micro-operation (uop) for execution before receiving confirmation of the validity of source data associated with the uop and without regard to availability of the source data, and to read the source data in parallel with the speculative scheduling, if the logic does not have a previously allocated uop ready for scheduling and responsive to a speculative scheduling indication for the uop, logic to determine whether the source data is available and if so, to dispatch the uop to an execution stage and to write a ready status to the speculative scheduling logic in parallel with the dispatch, the processor further including logic to cancel dispatching of the uop for execution if the source data is invalid.

9. The system of claim 8, wherein the processor further includes logic to cancel dispatching of a dependent uop for execution if the source data is invalid.

10. The system of claim 9, wherein the logic to cancel dispatching of a dependent uop for execution if the source data is invalid includes AND logic responsive to first and second indicators, the first indicator to indicate that the uop has been speculatively scheduled and corresponding to the speculative scheduling indication, the second indicator to indicate that source data associated with the uop is not valid.

11. The system of claim 10, wherein the processor further includes:
    a register alias table to provide the first indicator; and
    a reorder buffer to provide the second indicator.

12. The system of claim 9, wherein the logic to cancel dispatching of a dependent uop for execution if the source data is invalid includes additional AND logic responsive to the first indicator and to a third indicator, the third indicator to indicate that additional source data associated with the uop is not valid.

13. A method comprising:
    allocating a uop for scheduling;
    scheduling the uop for execution regardless of when source data associated with the uop may become available responsive to an indication received in a scheduler from an allocator that the uop is to be speculatively scheduled and if no previously allocated uops in the scheduler are ready for scheduling, and to read the source data in parallel with the speculative scheduling;
    determining whether the source data is available and if so, to dispatch the uop to an execution stage and to write a ready status to the scheduler in parallel with the dispatch; and
    canceling the uop before execution if the source data associated with the uop is not available.

14. The method of claim 13, further comprising:
    cancelling a dependent uop before execution if the source data associated with the uop is not available.

15. The method of claim 14, wherein cancelling a dependent uop before execution if the source data associated with the uop is not available includes canceling the dependent uop before execution in response to first and second indicators, the first indicator to indicate that the uop has been speculatively scheduled, the second indicator to indicate that source data associated with the uop is not valid.

16. An apparatus comprising:
a processor including:
- a front end stage to generate decoded micro-operations (uops);
- an out-of order stage coupled to the front end stage to receive a first uop and allocate the first uop for scheduling including provision of a speculative scheduling indication associated with the first uop, responsive to the speculative scheduling indication to determine whether a previous uop is ready for scheduling and if so to terminate speculative scheduling of the first uop, and otherwise to speculatively schedule the first uop regardless of when source data for the first uop may become available, to read the source data in parallel with the speculative scheduling, dispatch the first uop to an execution stage in parallel with writing a ready status, and to subsequently cancel the first uop if the source data is not available or valid; and
- the execution stage to execute the first uop dispatched from the out-of-order stage.

17. The apparatus of claim 16, wherein the first uop is to be speculatively scheduled if a reservation station of the out-of-order stage does not have the previous uop.

18. The apparatus of claim 16, wherein the out-of-order stage is to cancel at least one dependent uop when the first uop is cancelled.

* * * * *